Patented May 17, 1927.

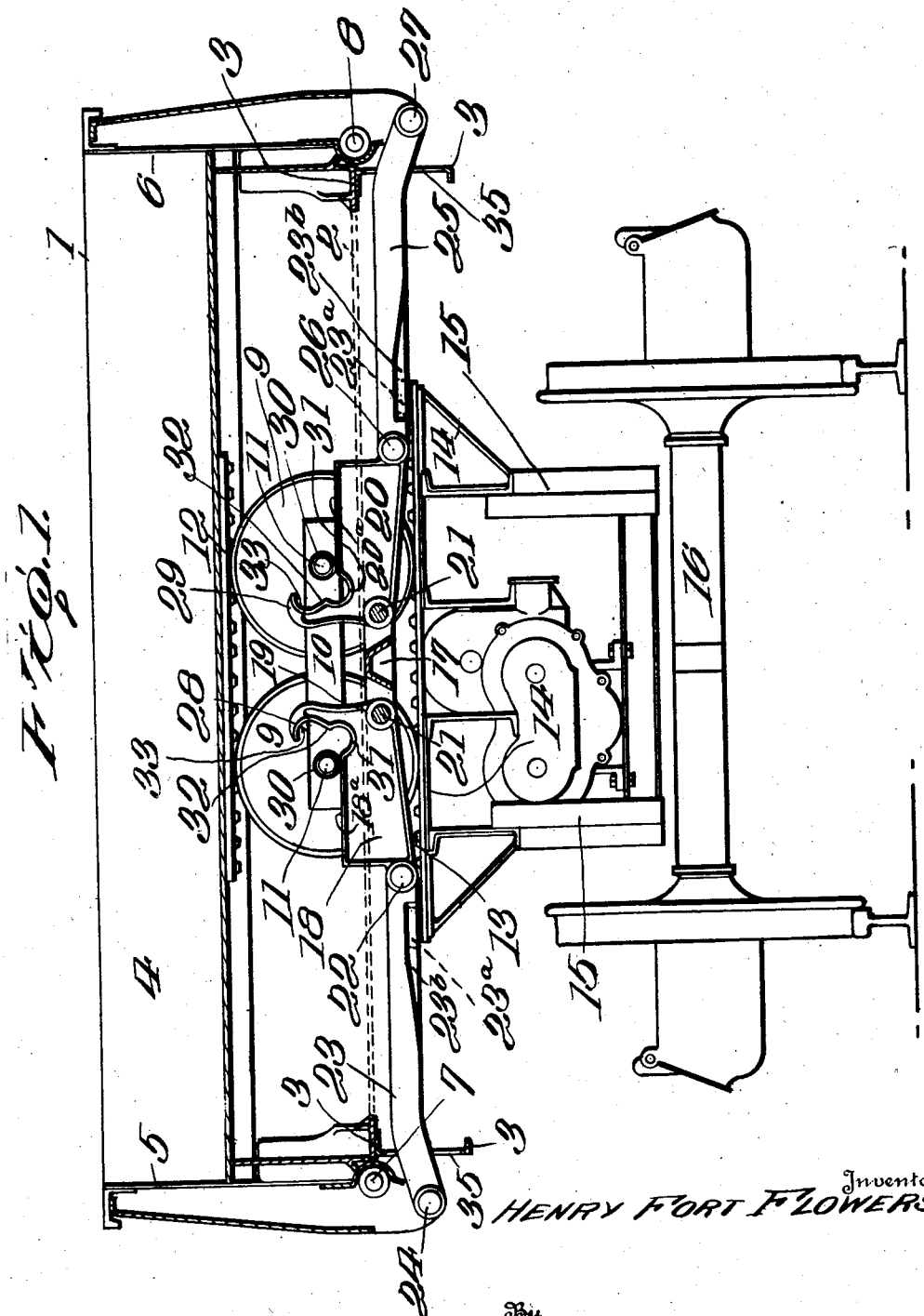

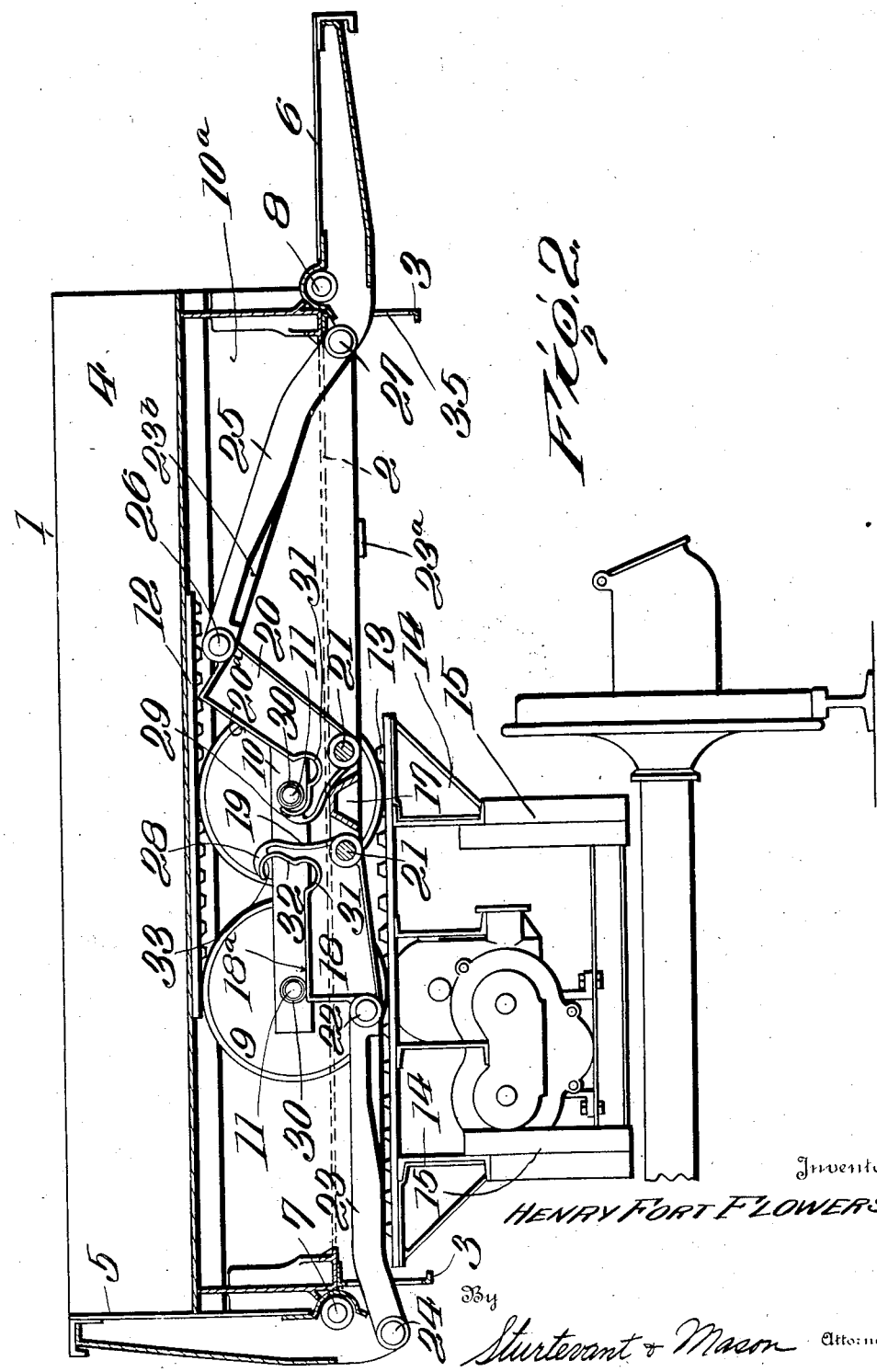

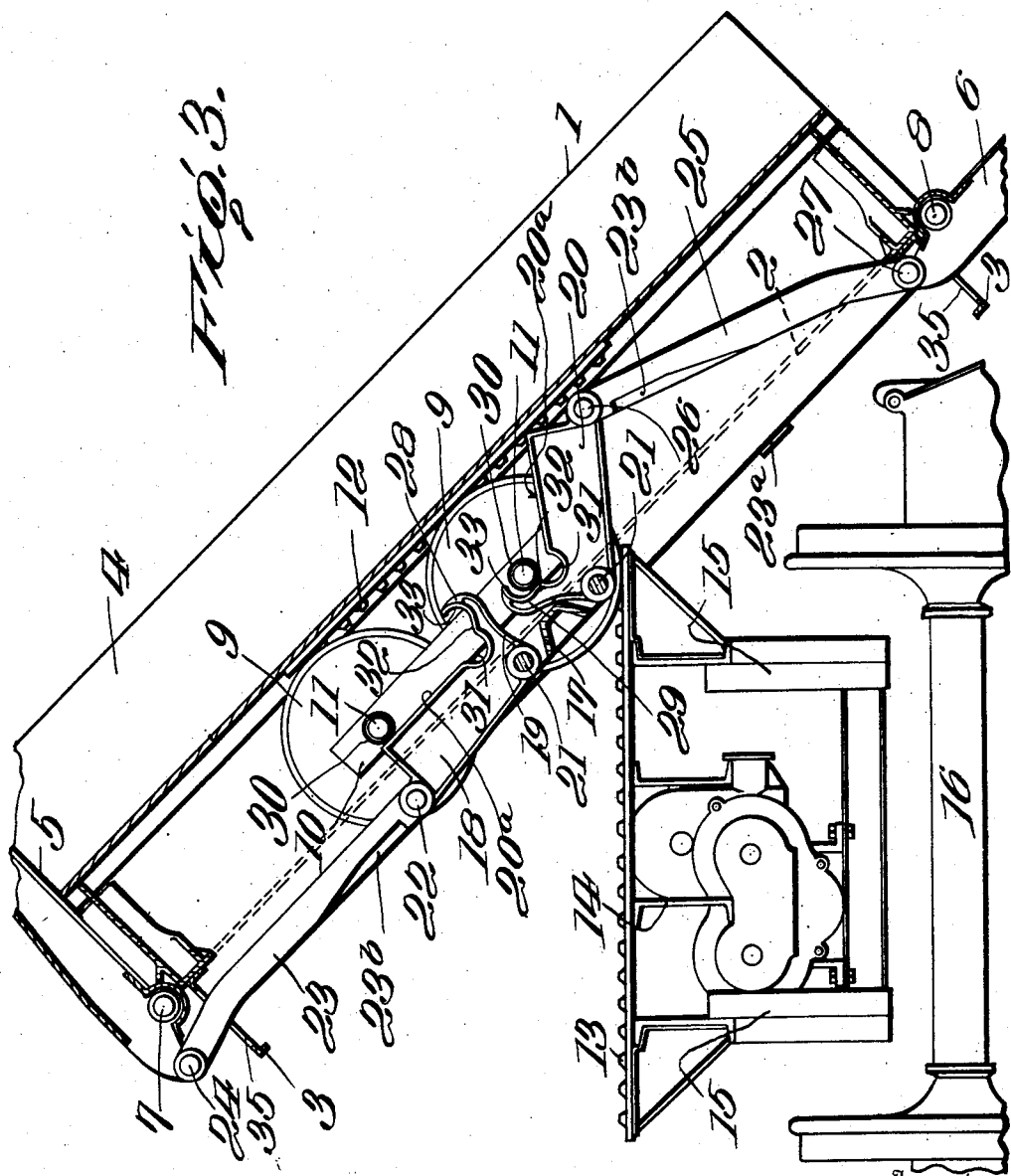

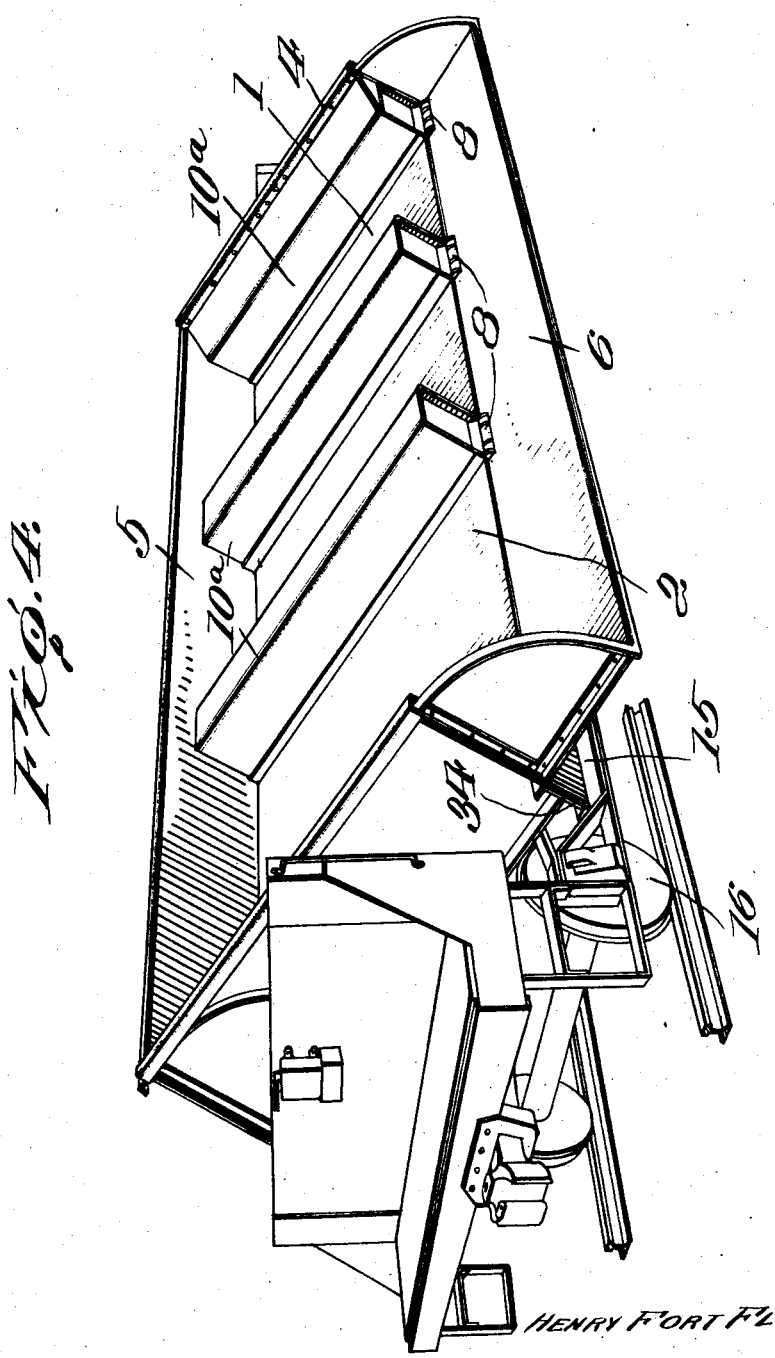

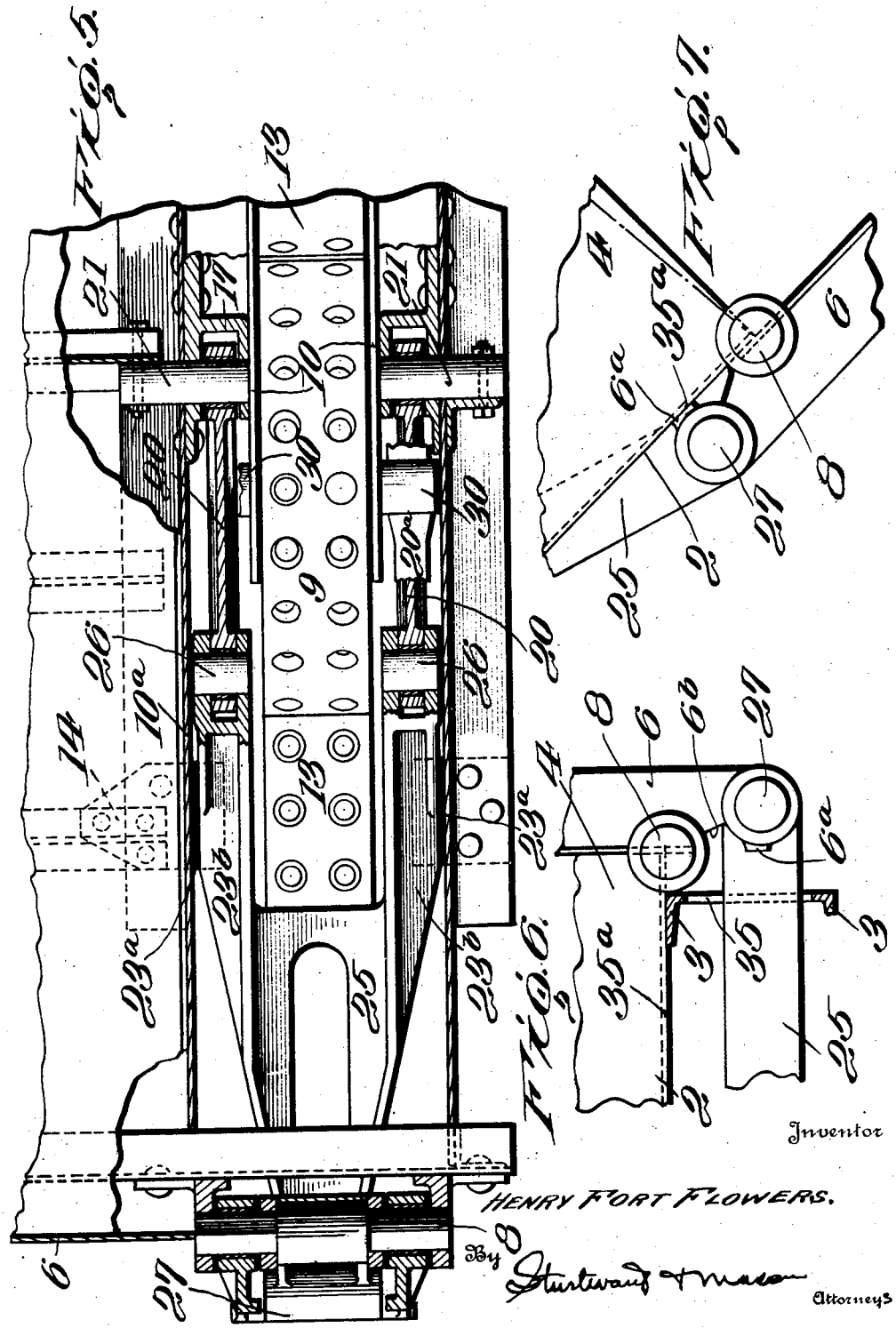

1,628,963

UNITED STATES PATENT OFFICE.

HENRY FORT FLOWERS, OF FINDLAY, OHIO.

DUMP CAR.            REISSUED

Application filed November 6, 1923. Serial No. 673,115.

The invention relates to new and useful improvements in dump cars, and more particularly to a dump car wherein the body portion is adapted to move laterally and to be tilted for dumping the contents of the car at the side thereof.

An object of the invention is to provide a dump car of the above type having side doors which are pivoted so as to be swung to facilitate the emptying of the contents of the car with means whereby the bodily lateral or transverse movement of the car automatically operates to positively open the door at one side or the other depending upon which way the body portion of the car is moved.

A further object of the invention is to provide a dump car of the above type wherein the lateral movement of the car body preliminary to tipping is utilized for operating the door opening mechanism whereby the complete effect of the tipping movement is availed of for speedily dumping the contents of the car.

A still further object of the invention is to provide a door opening and closing means which operates to positively lock the door in closed position.

Yet another object of the invention is to provide a dump car of the above type having side doors hinged at their bottom edges, wherein the opening and closing means also operates to rigidly secure or hold the door when in open position.

These and other objects will in part be obvious and will in part be hereinafter more fully disclosed.

In the drawings which show by way of illustration one embodiment of the invention—

Figure 1 is a view in transverse section showing a dump car embodying my improvements, both of the side doors being closed and the body in normal carrying position;

Fig. 2 is a view showing the body moved laterally to the right with the doors open and the body ready for the tilting or dumping;

Fig. 3 is a similar view but showing the body moved to the right and tilted for dumping the contents thereof, and the side door at the right opened and held in open position by my improved opening and closing means;

Fig. 4 is a perspective view of a car embodying the improvements, the under and end portion being shown more or less diagrammatically;

Fig. 5 is a view partly in section and partly in plan through one of the housings, showing the operating mechanism for the door at one side of the car;

Fig. 6 is a detail showing more or less diagrammatically the lower part of the door, the pivot therefor, the adjusting frame structure, the link for operating the door, and the stop for limiting the swinging movement of the door, and Fig. 7 is a similar view showing the parts swung to open position.

The invention in its broadest aspect is directed to a dump car mounted on trucks, or any other vehicle, adapted to be propelled by steam, electricity or otherwise. The body portion includes a floor and ends and side doors. This body portion is mounted on a suitable under-framework which includes a supporting means so that the body of the car may be moved laterally and may tilt for emptying the contents thereof. For this purpose, I prefer to use a structure similar to that shown in my prior Patents Nos. 1,268,829 and 1,268,830, granted June 11, 1918. It will be noted that the body portion is mounted on traveling rollers or wheels which permits the body portion to move laterally and then tilt for discharging the contents thereof. Suitable power means may be provided for moving the body portion laterally on its supporting wheels and for tilting the same. These supporting wheels, when the body portion is moved laterally, travel laterally of the under frame structure, but the body portion travels faster than the wheels so that said body portion is located substantially centrally over the wheels at one side, when in extreme lateral position. When in this lateral position, the car body is tipped by the motor mechanism. During the tipping, it turns on the wheels located substantially centrally beneath the car body as a fulcrum. During this tilting movement, the other wheels are raised bodily from its under support so as to remain in contact with the under portion of the body. The bodily movement of the body is utilized for opening and closing the side doors.

The invention will possibly be better understood by a detail reference to the present embodiment as illustrated in the drawings. As shown in Fig. 1, the improved dump car consists of a body portion 1 which is formed with a floor 2 mounted on suitable supports 3, 3. There are also ends 4 and side doors 5 and 6. These side doors are similarly constructed. The side door 5 is pivoted at 7 to this body 3, while the side door 6 is pivoted at 8 thereto. It will be noted from Figures 2, 3, 6 and 7 that the side door is hinged to the body frame so as to be flush with the floor when in open position. The body portion is mounted on pairs of rollers 9, 9. There will be as many pairs of rollers as is needed for the proper support of the body portion of the dump car. In a relatively small car, there would be a pair of rollers at each end, but in long cars, there may be intermediate supporting rollers.

At the ends of the car there are upset portions or raised housings indicated at $10^a$ in the drawings. In long cars, there are intermediate housings which are indicated at $10^a$ in Fig. 4 of the drawings. These rollers are located in the housings. At the upper inner side of each housing is a rack bar 12 (see Fig. 1). This rack bar faces downwardly. On the frame immediately beneath the rack bar 12, there is a rack bar 13. The rollers 9 are disposed between these rack bars 12 and 13, and thus make running contact with the rack bar 12. Said rollers are provided with recesses to receive the teeth of the rack bar. The rack bar 13 is mounted on the under frame structure 14 carried by supports 15 mounted on suitable trucks 16. There is a central beam or support 17 which is fixed to the car body structure. Each roller is provided with a spindle or hub 11 which projects laterally from each side of the roller, and links 10 on opposite sides of the roller connect these hubs or spindles of the rollers and thus hold the rollers in a predetermined relation to each other. The car body and contents thereof is supported on these rollers, and is capable of being moved either to the right or the left as viewed in Fig. 1. This lateral movement of the car body is brought about by means of suitable cables or other mechanism operated from a suitable source of power, and which is preferably under the control of the operator while at the end of the car. The prior patents referred to above show a mechanism which could be used for this purpose. When the car body is moved laterally, the supporting wheels travel either to the right or the left depending upon the direction of movement of the body, and the car body moves along the upper face of the rollers. The body portion of the car travels faster than the rollers so that said body portion is located substantially centrally over the wheels at one side when in its extreme lateral position. When the car body is tipped by the pull of the motor driven mechanism, it turns on the wheels located substantially centrally beneath the car body as a fulcrum. As is noted above, during this tilting movement, the other wheels are raised bodily from the rack bar 13 and remain in contact with the rack bar 12.

There is an independently operated mechanism at each side of the car body for positively opening and closing the doors. When the car body is moved to the left as viewed in Fig. 1, the mechanism associated with the door 5 will positively open said door 5, and when it is brought back to normal position, said mechanism will positively close the door. Meanwhile, the operating mechanism for the door 6 positively holds said door in closed position. Pivoted on the central frame 17 is a pair of levers 18 which are associated with the door opening mechanism for the door 5. Likewise, pivotally mounted on the central frame is a pair of levers 20 which are associated with the operating mechanism for the door 5. Levers 18 are pivoted at their outer ends by pivots 22, 22, to a yoke lever 23. The end of this yoke lever is pivoted at 24 to the door 5. Likewise, on the other side of the car, the levers 20, 20 are pivoted by pivots 26, 26, to a yoke lever 25, which in turn is pivoted at 27 to the side door 6. Each of the levers 18 has an upwardly projecting arm 28, while each of the levers 20 is provided with an upwardly projecting arm 29. On the ends of the spindles or hubs there are rollers 30, although these rollers may be dispensed with and the ends of the spindles themselves utilized for the same purpose. These rollers 30 are adapted to engage the upper horizontal faces $18^a$ of the levers 18, and $20^a$ of the levers 20, respectively. It is noted that these horizontal faces $18^a$ and $20^a$ are of considerable length, and when the car body moves to the right as viewed in Fig. 1, the roller 30 at the left will remain in contact with the horizontal faces $18^a$ and this will prevent the levers 18 from swinging on their pivots 21 in a clockwise direction. As this prevents any movement of the levers 18, it will also prevent any movement of the yoke lever 23, and thus hold the door 5 in closed position. Located at opposite sides of the yoke levers are stops $23^a$. These stops are secured to the body portion of the car and move therewith, but are fixed relative to the car body. The inner end of the yoke levers 23 and 25 is provided with a recess $23^b$, each lever having a recess and these stops engage these respective recesses when the yoke lever 23 is in the position shown in Fig. 1. Said stops engage the wall of the lever at the upper side of the recess. The levers 18 together with the yoke lever 23 form toggle levers for controlling the door 5. When in the position shown in Fig. 1, that is, with the car body in horizontal position, the yoke levers rest on these stops, and so the toggle levers cannot move downwardly. At the same time, the rollers 30 rest on the horizontal faces 18ª of the levers 18 and prevent said levers from moving upwardly. Thus it is that the door 5 is positively locked, because the toggle levers cannot move in either direction when the parts are positioned as above stated.

It will be noted that when the car body is moved to the right as viewed in Fig. 3, that this relation of the toggle levers to the stops 23 and the rollers 30 remain as stated, the rollers 30 merely rolling along the faces 18ª of the levers 18. So it is that the door remains positively locked through these toggle levers during the tilting movement of the car body. Inasmuch as the levers 18 cannot move downwardly when the car body is tilted, said levers also operate through the rollers 30 to hold the left-hand rollers 9 in contact with the rack bar 12, and constantly in mesh with said rack bar.

Each of the arms 28 and 29 is provided with a recess 33 directly beneath its upper end, and with a shoulder 32, and beneath the shoulder 32 there is a clearance space 31. As the car body moves to the right from the position shown in Fig. 1, to the position shown in Fig. 2, the rollers 30 will move away from the ledges 20ª and will engage the upstanding arms 29 at the shoulders 32 and will move along these arms into the recesses 33. During this movement of the car body which carries the rollers into the recesses 33, the levers 20 will be swung on their pivots 21 to the position shown in Fig. 2. This causes the toggles to move upwardly and will draw in on the toggle lever 25 and positively open the door 6. The pivotal point 27 between the link 25 and the door 6 is disposed a distance below the hinge point 8 of the door. This downwardly projecting portion of the hinge for the door is provided with a stop 6ª. The portion of the hinge between the two pivots referred to is cut away at 6ᵇ. The side frame structure 3 is cut away at 35 to permit the yoke lever 25 to extend from the frame and pivot at 27 to the lower part of the hinge. When the door is swung to open position, as shown in Fig. 7, the lower part of the hinge structure moves through the opening 35, the clearance 6ᵇ permitting such movement of the hinge structure, and the stop 6ª will contact with the floor of the car at the point 35ª. This positively limits any further outward movement of the door. At this time, the inner face plate of the door 6 projects slightly underneath the floor 2, so that there is no opening between the door and the floor. Furthermore, the face of the door is substantially flush with the inner face of the floor 2.

Inasmuch as the door cannot move any further, neither can the toggle move any further, said toggles being limited by a stop on the door rather than by any contact with a lug or the bottom of the car. As the toggle levers cannot move any further about their pivots 21, the rollers 30 can move no further, and this will stop the lateral movement of the car. Of course, the operator who is controlling the lateral movement of the car body through the power mechanism, will shut off the power at this time so as not to strain the operating mechanism.

When the car body is moved again to the left as viewed in Figures 2 and 3, the rollers 30 will move away from the upwardly projecting ends 29 and release the toggles. These rollers 30 will do something more than release the toggles. They will engage the ledges 20ª on the levers 20 and will positively swing the toggles into alinement and thus positively force the door to closed position. The levers 20 when engaged by the rollers 30 are swinging so that there is more or less of a rolling contact between the levers and the rollers 30, and thus it is that the rollers may be dispensed with, and the ends of the spindles themselves used for the purpose of operating the toggle levers.

From the above it will be apparent that operating mechanism has been provided for each door, and the operating mechanisms for the two doors are independent of each other, so that one of these mechanisms can be utilized for opening and closing one of the doors, while the other is utilized for holding the opposite door in closed position, the particular mechanism which is operated depends upon the direction in which the car body is moved. While I have shown the door as positively opened and closed during the lateral movement of the car body and before the car body is tilted, it will be understood that from certain aspects of the invention, these mechanisms can be arranged so as to open and close the door while it is being tilted. I prefer, however, the above structure, which opens the door before the car body begins to tilt, as it enables the car body to be projected laterally to its full extent and the door opened before too great weight through the material is placed on the door structure. In other words, as soon as the car body tilts, then the load comes against the door and puts a terrific strain on the mechanism which controls the door, but by my improved structure, however, where the car body is horizontal when the door is open, this strain on the door is greatly relieved. The mechanism for operating the doors, however, is extremely simple, and may be readily adapted for opening and closing the door during tilting, and I do not wish, therefore, to be limited to the opening and closing of the door before the body tilts, unless so specifically stated in the claims.

It is obvious that minor changes in the details of the structure and the arrangement of the parts may be made without departing from the spirit of the invention as set forth in the appended claims.

Having thus described the invention, what I claim as new and desire to secure by Letters Patent, is—

1. A dump car including a body adapted to be moved laterally and tilted for dumping, means for moving said body laterally and subsequently tilting the body to dump the contents thereof, a door at the side of said body, and means operated by the lateral movement of said body for opening said door.

2. A dump car including a body adapted to be moved laterally and tilted for dumping, a door for closing the side of said body, means for pivotally supporting said door on said body, means for moving said body laterally in a substantially horizontal plane, and subsequently tilting said body for dumping the contents thereof, and means operated by the lateral movement of said body prior to the tilting of the body for opening said door.

3. A dump car including in combination, a body having swinging side doors, a supporting structure for said body, means whereby said body may be moved laterally on said supporting structure to either side thereof, and for subsequently tilting said body at the end of its lateral movement for emptying the contents thereof, and means operated by the lateral movement of said body for positively opening said side door— through which the contents are to be discharged—during the lateral movement of said body and for closing said side door when the body is returned to its normal position.

4. A dump car including in combination, a body having swinging side doors, a supporting structure for said body, means whereby said body may be moved laterally on said supporting structure to either side thereof, and for subsequently tilting said body at the end of its lateral movement for emptying the contents thereof, and means operated by the lateral movement of said body for positively opening said side door— through which the contents are to be discharged—during the lateral movement of said body and for closing said side door when the body is returned to its normal position, said means for closing said side door being arranged to positively hold said door closed when the body is in normal position for carrying.

5. A dump car including a body having swinging side doors, a structure for supporting said body whereby the same may be moved laterally either to one side or the other of the supporting structure and subsequently tilted, operating devices associated with each side door for positively opening and closing the same, and means whereby the lateral movement of the body operates upon the devices controlling the side door through which the contents are to be emptied for positively opening the side door when the body is moved to lateral position and for positively closing the side door when said body is moved to normal position.

6. A dump car including a body having swinging side doors, a structure for supporting said body whereby the same may be moved either to one side or the other of the supporting structure and subsequently tilted, operating devices associated with each side door for positively opening and closing the same, and means whereby the lateral movement of the body operates upon the devices controlling the side door through which the contents are to be emptied for positively opening the side door when the body is so moved and for positively closing the side door when said body is moved to normal position.

7. A dump car including a body having swinging side doors, a structure for supporting said body whereby the same may be moved either to one side or the other of the supporting structure and subsequently tilted, operating devices associated with each side door for positively opening and closing the same, and means whereby the lateral movement of the body operates upon the devices controlling the side door through which the contents are to be emptied for positively opening the side door when the body is so moved and for positively closing the side door when said body is moved to normal position, said devices including means for holding the doors in closed position when said body is in normal position for carrying.

8. A dump car including in combination a body, side doors hinged at the bottom edge thereof for closing the sides of the body, pairs of supporting wheels for said body, said wheels being constructed so as to move bodily with the lateral movement of the body of the dump car, to a less extent than the movement of said body, devices connected with the side doors and adapted to be operated upon by means movable with said body for positively moving one side door or the other for opening the same when the body is moved laterally and for closing the same when said body is returned to normal position.

9. A dump car including in combination a body, side doors hinged at the bottom edge thereof for closing the sides of the body, pairs of supporting wheels for said body, said wheels being constructed so as to move bodily with the lateral movement of the body of the dump car, to a less extent than the movements of said body, devices connected with the side doors and adapted to be operated upon by means movable with said body for positively moving one side door or the other for opening the same when the body is moved laterally and for closing the same when said body is returned to normal position, said means carried by said wheels operating also to rigidly hold the side doors in closed position when the body is in normal position for carrying.

10. A dump car including in combination, a body, pairs of supporting wheels on which said body is mounted, said wheels being adapted to move bodily with the body for positioning the body for dumping, to a less distance than the movement of the body, a hinged side door for each side of the body, extensions extending below the pivot of the hinges, levers pivotally supported on said body, and links connecting said levers to the extensions on the hinges of the respective side doors, rollers carried by said wheels, said levers having extensions extending into the path of the rollers and positioned so that said wheels when moved in one direction will engage one of the levers for positively opening the side door connected thereto and when moved in the other direction will engage the other lever for positively opening the other side door.

11. A dump car including in combination a body, pairs of supporting wheels on which said body is mounted, said wheels being adapted to move bodily with the body for positioning the body for dumping, to a less distance than the movement of the body, a hinged side door for each side of the body, extensions extending below the pivot of the hinges, levers pivotally supported on said body, and links connecting said levers to the extensions on the hinges of the respective side doors, rollers carried by said wheels, said levers having extensions extending into the path of the rollers and positioned so that said wheels when moved in one direction will engage one of the levers for positively opening the side door connected thereto and when moved in the other direction will engage the other lever for positively opening the other side door, said levers being constructed so that the rollers cooperating therewith will positively move said side doors to closed position.

12. A dump car including in combination a body, pairs of supporting wheels on which said body is mounted, said wheels being adapted to move bodily with the body for positioning the body for dumping to a less distance than the movement of the body, a hinged side door for each side of the body, extensions extending below the pivot of the hinges, levers pivotally supported on said body, and links connecting said levers to the extensions on the hinges of the respective side doors, rollers carried by said wheels, said levers having extensions extending into the path of the rollers and positioned so that said wheels when moved in one direction will engage one of the levers for positively opening the side door connected thereto and when moved in the other direction will engage the other lever for positively opening the other side door, said levers being constructed so that the rollers cooperating therewith will positively move said side doors to closed position, said levers also being constructed so that said rollers operate to positively hold said doors in closed position when the body is in normal position for carrying.

13. A dump car including in combination, a body having a swinging side door at each side thereof, said door being pivoted so that when swung to its open position the door is substantially in the same plane as the floor of the body, means for moving said body laterally to either side thereof and subsequently tilting said body for dumping, means for opening one of the side doors during the lateral movement of the body to tilting position, and similar means for holding the other door closed during said lateral movement.

14. A dump car including in combination, a body, having a swinging side door at each side thereof, an operating mechanism for opening and closing each door, said operating mechanisms being independent of each other, means for supporting the car body whereby the same may be moved laterally to either side thereof and tilted for dumping, said operating mechanism for the door being constructed so that one mechanism holds its associated door in closed position while the other mechanism operates to open and close the door associated therewith, said operating mechanisms for the doors being so constructed as to open the door at the side for dumping during the lateral movement of the body to dumping position and a stop carried by each door adapted to engage a shoulder on the body of the car when said door is swung to open position for limiting the movement of the door and the lateral movement of the car body.

In testimony whereof, I affix my signature.
HENRY FORT FLOWERS.